(12) United States Patent
Sander

(10) Patent No.: US 7,229,202 B2
(45) Date of Patent: Jun. 12, 2007

(54) LIGHT-EMITTING DIODE ILLUMINATION SYSTEM FOR AN OPTICAL OBSERVATION DEVICE, IN PARTICULAR A STEREOMICROSCOPE OR STEREO SURGICAL MICROSCOPE

(75) Inventor: Ulrich Sander, Rebstein (CH)

(73) Assignee: Leica Microsystems (Schweiz) AG, Heerbrugg (CH)

(*) Notice: Subject to any disclaimer, the term of this patent is extended or adjusted under 35 U.S.C. 154(b) by 135 days.

(21) Appl. No.: 10/926,695

(22) Filed: Aug. 26, 2004

(65) Prior Publication Data

US 2005/0047172 A1  Mar. 3, 2005

(30) Foreign Application Priority Data

Aug. 28, 2003 (DE) ............... 103 39 618

(51) Int. Cl.
*F21V 5/00* (2006.01)
*G02B 21/00* (2006.01)

(52) U.S. Cl. .......... 362/575; 362/231; 362/236; 362/555; 362/800; 362/804; 359/376; 359/385

(58) Field of Classification Search ............ 362/231, 362/236–238, 555, 572, 575, 800, 804; 359/368, 359/376–378, 385–390
See application file for complete search history.

(56) References Cited

U.S. PATENT DOCUMENTS

| | | | |
|---|---|---|---|
| 4,788,426 A * | 11/1988 | Kuehnle | 250/580 |
| 4,852,985 A * | 8/1989 | Fujihara et al. | 359/387 |
| 5,471,052 A | 11/1995 | Ryczek | |
| 6,069,689 A * | 5/2000 | Zeng et al. | 356/73 |
| 6,249,381 B1 | 6/2001 | Suganuma | |
| 6,886,964 B2 * | 5/2005 | Gardiner et al. | 362/276 |
| 6,969,843 B1 * | 11/2005 | Beach et al. | 250/228 |
| 2003/0007365 A1 | 1/2003 | Sander | |
| 2003/0042493 A1 | 3/2003 | Kazakevich | |
| 2003/0147254 A1 * | 8/2003 | Yoneda et al. | 362/551 |

FOREIGN PATENT DOCUMENTS

| | | |
|---|---|---|
| DE | 1913711 | 10/1969 |
| DE | 3418839 A1 | 11/1985 |
| DE | 3734691 C2 | 4/1988 |
| WO | WO-01/62012 A1 | 8/2001 |
| WO | WO-01/69302 A2 | 9/2001 |

OTHER PUBLICATIONS

Patent Abstracts of Japan—Publication No. 09127424 A—Yokogawa Electric Corp.—"Light Source"—Published May 16, 1997.

(Continued)

*Primary Examiner*—Sandra O'Shea
*Assistant Examiner*—Jason Moon Han
(74) *Attorney, Agent, or Firm*—Hodgson Russ LLP

(57) ABSTRACT

The invention concerns an illumination apparatus for an optical observation device (10), in particular a stereomicroscope or a stereo surgical microscope. A multi-armed light guide with coupler (2) mixes colored light emitted by light-emitting diodes (1*a–c*) to yield white mixed light (15).

15 Claims, 5 Drawing Sheets

OTHER PUBLICATIONS

Patent Abstracts of Japan—Publication No. 09298312 A—Hitachi Cable Ltd.—"Multi-Color Light Source"—Published Nov. 18, 1997.

Patent Abstract of Japan—Publication No. 2000133029 A—TB Optical KK—"Light Source Device"—Published May 12, 2000.

Patent Abstracts of Japan—Publication No. 2003029158 A—Olympus Optical Co. Ltd. "—Illuminating System And Microscope Using The Same"—Published Jan. 29, 2003.

Siemens Magazine, Evdoxia Tsakiridou, "Licht der Zukunft," pp. 38-39, Apr. 2000, Germany.

* cited by examiner

LIGHT-EMITTING DIODE ILLUMINATION SYSTEM FOR AN OPTICAL OBSERVATION DEVICE, IN PARTICULAR A STEREOMICROSCOPE OR STEREO SURGICAL MICROSCOPE

CROSS REFERENCE TO RELATED APPLICATIONS

This application claims priority of the German patent application 103 39 618.7 filed Aug. 28, 2003 which is incorporated by reference herein.

FIELD OF THE INVENTION

The invention concerns an illumination apparatus for an optical observation device, in particular a stereomicroscope or a stereo surgical microscope.

BACKGROUND OF THE INVENTION

Light-emitting diodes (LEDs) that emit colored light have now become so bright that they are used, for example, for traffic signal systems and in the rear lights of vehicles.

For a microscope illumination system, white light is principally desirable. White-light-emitting LEDs already exist. These are not, however, bright enough for this application. A plurality of light-emitting diodes arranged next to one another and emitting red, green, and blue light can be used to generate white light.

DE 37 34 691 C2 presents a solution making possible a variety of illumination types and an intensity control capability with the aid of this type of red-green-blue arrangement of many small LEDs. A bright-field, dark-field, or oblique illumination can be produced by selective local activation of the individual LEDs. The overall intensity of the illumination can be regulated by the fact that either all or fewer LEDs are in operation, or on the other hand only those LEDs that result in a specific configuration. The individual LEDs are not, however, individually controllable; they can only be switched on and off.

To achieve uniformly homogeneous coverage of the illumination aperture, a frosted disk must be introduced in the immediate vicinity of the LED light source.

A further embodiment according to this existing art provides that white light can be generated with a red, green, and blue planar LED light source and a system of dichroic splitters. This illumination apparatus offers a high light intensity, but is relatively bulky. Because of the long optical paths, the light must be collimated using additional lenses. A further disadvantage is the high alignment accuracy of the dichroic mirrors required to ensure good and constant color accuracy.

The disadvantages of tungsten lamps, halogen lamps, etc., as used hitherto for microscopes, are principally high thermal dissipation, high power consumption and short service life, little robustness, large space requirement, and heavy weight (cf. DE 37 34 691 C2, col. 1, lines 7–12).

DE 19 13 711 A presents a solution for uniform light distribution and intensity regulation of a single conventional light source (Planck radiator) by means of fiber bundles. For that purpose, a fiber bundle having a single entrance and exit surface is placed after the conventional light source with diaphragm. No positional allocation of the fibers with respect to the entrance and exit surface exists.

This offers the advantage that the inhomogeneous intensity distribution of the light source image is homogenized at the end of the fiber, and a continuous intensity regulation is produced at the end of the fiber by way of the diaphragm at the fiber entrance.

SUMMARY OF THE INVENTION

The basis of the present invention is not primarily the need for a uniform light distribution, but rather the combination and associated increase in intensity of the light from a variety of light sources, with no increase in space requirement and without the aforementioned disadvantages of conventional light sources.

It is presently the case in the existing art that a colored-light-emitting LED possesses a higher luminance than a white-light-emitting LED. Combining the light of three color LEDs makes the luminance difference as compared with a single white-light-emitting LED that much greater.

According to the present invention, therefore, at least one red-, one green-, and one blue-light-emitting LED are arranged physically next to one another. The light that emerges is fed respectively into a multi-arm light-guiding fiber bundle, each light guide arm being illuminated by one colored-light-emitting LED. The light guide arms are combined into one common light guide, and the individual light fibers are optimally mixed. The result is a light coupler. For effective light yield, it is preferable to use, instead of normal light guides, ones with hot-melted ends.

With the aid of these fiber-optic components, the light-emitting diodes can now also be arranged remotely from the microscope. This yields the advantage that the microscope body can be made small and light. A further advantage is the elimination of the need to place a frosted disk immediately in front of the optical system as a diffuser, since the scattering function of the frosted disk is taken over by the light-guiding fibers.

The colored light emerges in mixed fashion at the end near the microscope and is usable in toto as white light, and is moreover very much brighter than presently available LED light from white-light-emitting LEDs.

The white mixed light need not necessarily be assembled from red, green, and blue LED light; this can also be done using yellow and blue LED light.

It is a presently common procedure to mix white light from red, blue, and green light; the invention is, however, expressly not limited to that procedure. It is thus also possible, for example, to assemble white light from blue and yellow light; cf. in this context Siemens Magazin Forschung und Innovation/Leuchtdioden, New World 4/2000, p. 39.

The light coupler can also comprise a light-guiding rod system. If the light-guiding rods are correspondingly short, this yields the advantage of a compact design.

Numerical aperture adaptation can be achieved by way of a cross-section changer having different entrance and exit areas.

The spectrum of the illuminating light can furthermore be freely selected by electrical brightness regulation of the individual light-emitting diodes; no filters are necessary. It would be possible, for example, temporarily to use only the red-light-emitting LED to produce a returned light (red reflection) in ophthalmology, or only the green-light-emitting LED for red-free observation. "Blue light hazard" can be reduced by reducing the emission of the blue-light-emitting LED.

Tissue-specific changes can moreover be selectively depicted with this kind of false-color illumination. Better contrast can also thereby be obtained. This is done for diagnostic purposes, but also to ensure an illumination that damages tissue as little as possible.

The possibility furthermore exists of generating, with this spectrally selective illumination, only the particular light that contributes to the requisite imaging configuration of the microscope or to the spectral sensitivity of the observer's eye. If the LEDs cannot be electrically regulated without a change in color, controllable filters that damp the relevant color component as necessary could be selectably placed after them.

According to a refinement, a further fiber bundle can also be provided for feedback purposes. This fiber bundle receives, at the distal end of the fiber bundle (i.e. at the end located opposite the light source), the light reflected from the specimen and conveys it to a sensor that detects the light color and brightness. This information can thus be made available for evaluation, or used for control purposes. For example, any desired spectra can be preselected using a computer, and then compared with the measured ones. Deviations are compensated for by discrete activation and regulation of the respective color LEDs. This allows the generation of any desired illumination spectra deviating from the Planck radiation spectrum.

According to a further embodiment of the illumination apparatus according to the present invention, provision is made for acquiring false-color images using a camera, and storing them in the computer. At a later time, as desired, these can be reflected into or overlaid onto the currently active image in one or both stereomicroscope beam paths using a display.

Reference is also made to a simultaneously submitted application of the Applicant in which one or more white-light-emitting LEDs are integrated into the surgical microscope or into the illuminating optical system of the microscope. The teachings of the two applications are intended to be combinable.

Further embodiments of the invention are described in the Figures and in the dependent claims. The Parts List is a constituent of the disclosure.

BRIEF DESCRIPTION OF THE DRAWINGS

The invention is explained in more detail, in symbolic and exemplary fashion, with reference to the Figures. Identical reference characters denote identical components; reference characters with different indices indicate identically functioning or similar components. In the drawings, schematically in each case.

DETAILED DESCRIPTION OF THE INVENTION

Figure 1:
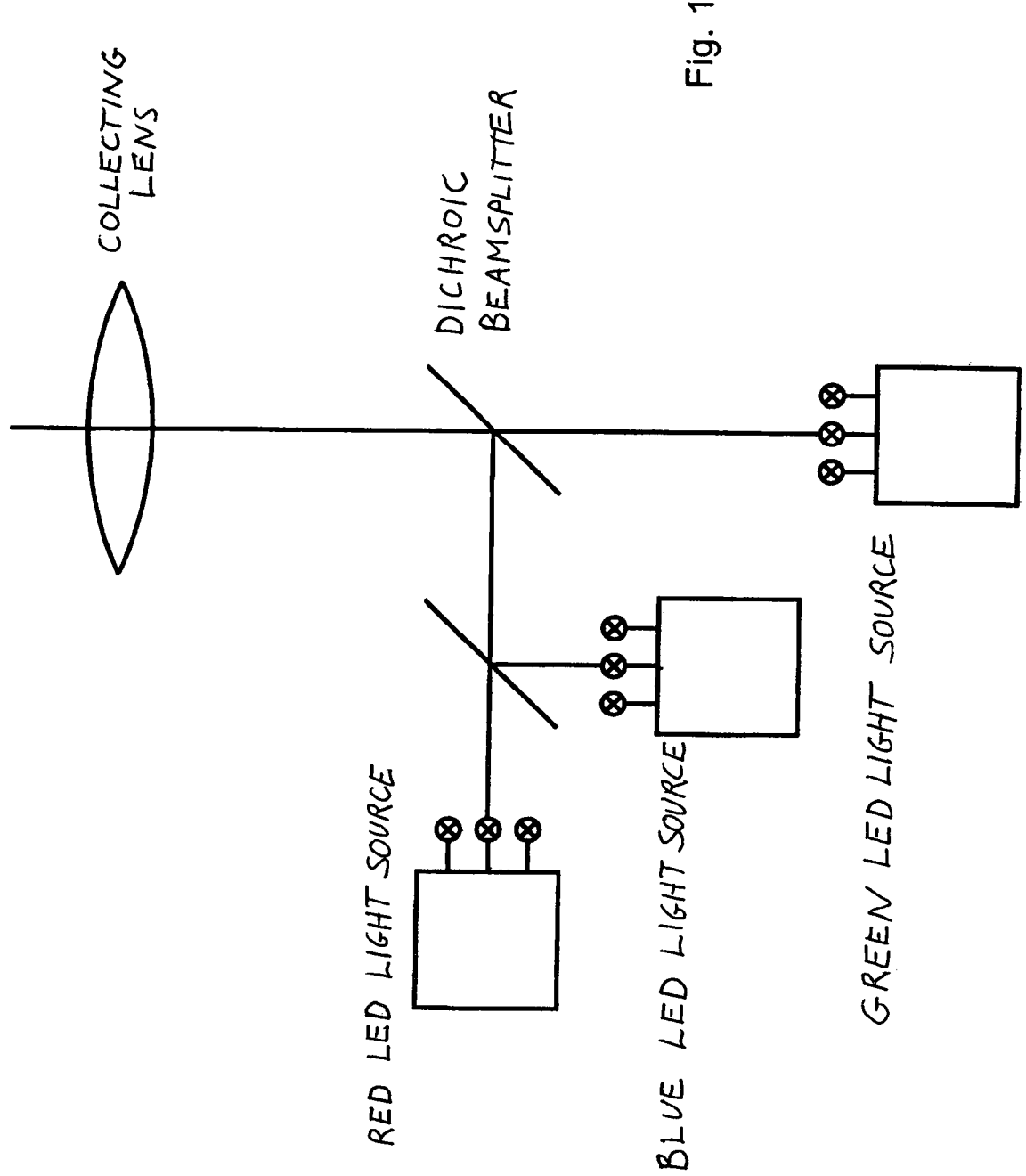
FIG. 1 shows an arrangement of three planar LED light sources that, using dichroic mirrors, combine red, green, and blue light into white mixed light in accordance with the existing art.

In FIG. 1, the light of a red, a green, and a blue planar LED light source is mixed into white light, in known fashion, using dichroic splitters.

Figure 2:
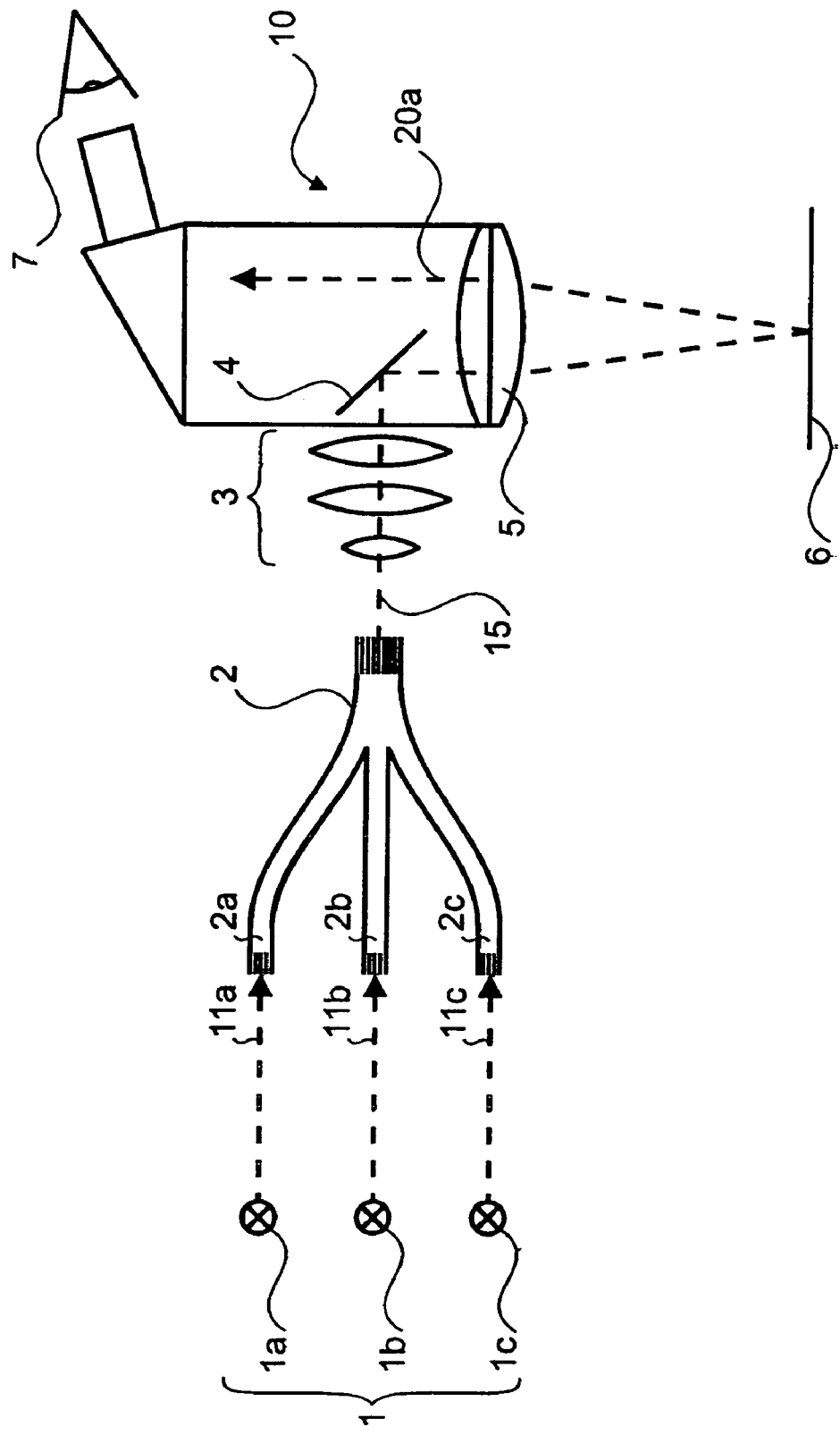
FIG. 2 shows an illumination apparatus according to the present invention for an optical observation device, e.g. a microscope, having three LEDs that blend red, green and blue LED into white mixed light using a light guide with coupler.

The illumination apparatus depicted in FIG. 2 encompasses at least one red-light-emitting LED 1a, one green-light-emitting LED 1b, and one blue-light-emitting LED 1c, which respectively emit red light 11a, green light 11b, and blue light 11c. This red-green-blue arrangement constitutes LED arrangement 1. Each of the light-emitting diodes 1a, 1b, 1c has associated with it one respective input of a total of three light guide arms 2a, 2b, 2c. The three light guide arms 2a, 2b, 2c come together and thus constitute a light guide with coupler 2 that has a single output. Here white mixed light 15 travels through an illuminating optical system 3 onto a mirror 4, by which it is directed through a main objective 5 of an optical observation device 10. Viewer 7 then sees the illuminated specimen 6 through observation beam path 20a.

Figure 3:
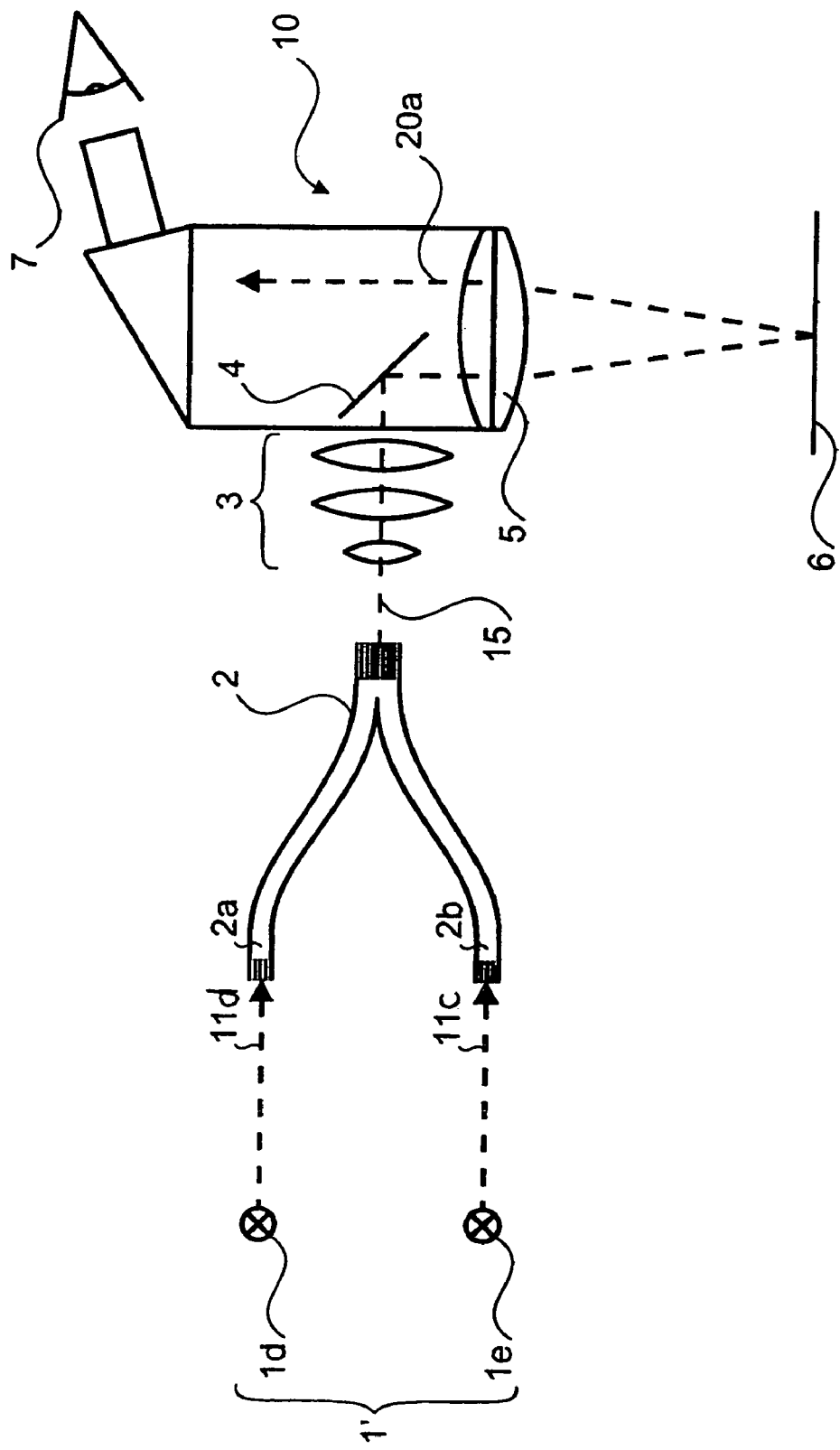
FIG. 3 shows an arrangement according to FIG. 2 that has only a yellow- and a blue-light-emitting LED and a corresponding light guide with coupler.

The arrangement shown in FIG. 3 is in principle the same as in FIG. 2, but here white illuminating light 15 is assembled from two light-emitting diodes: 1d that emits, for example, yellow light 1d, and 1e that emits, for example, blue light 11c. A three-armed light guide with coupler 2 is no longer necessary for this, a two-armed one instead being sufficient.

It is noted that LEDs 1a through 1e may be laser diodes or other semiconductor light sources.

Figure 4:
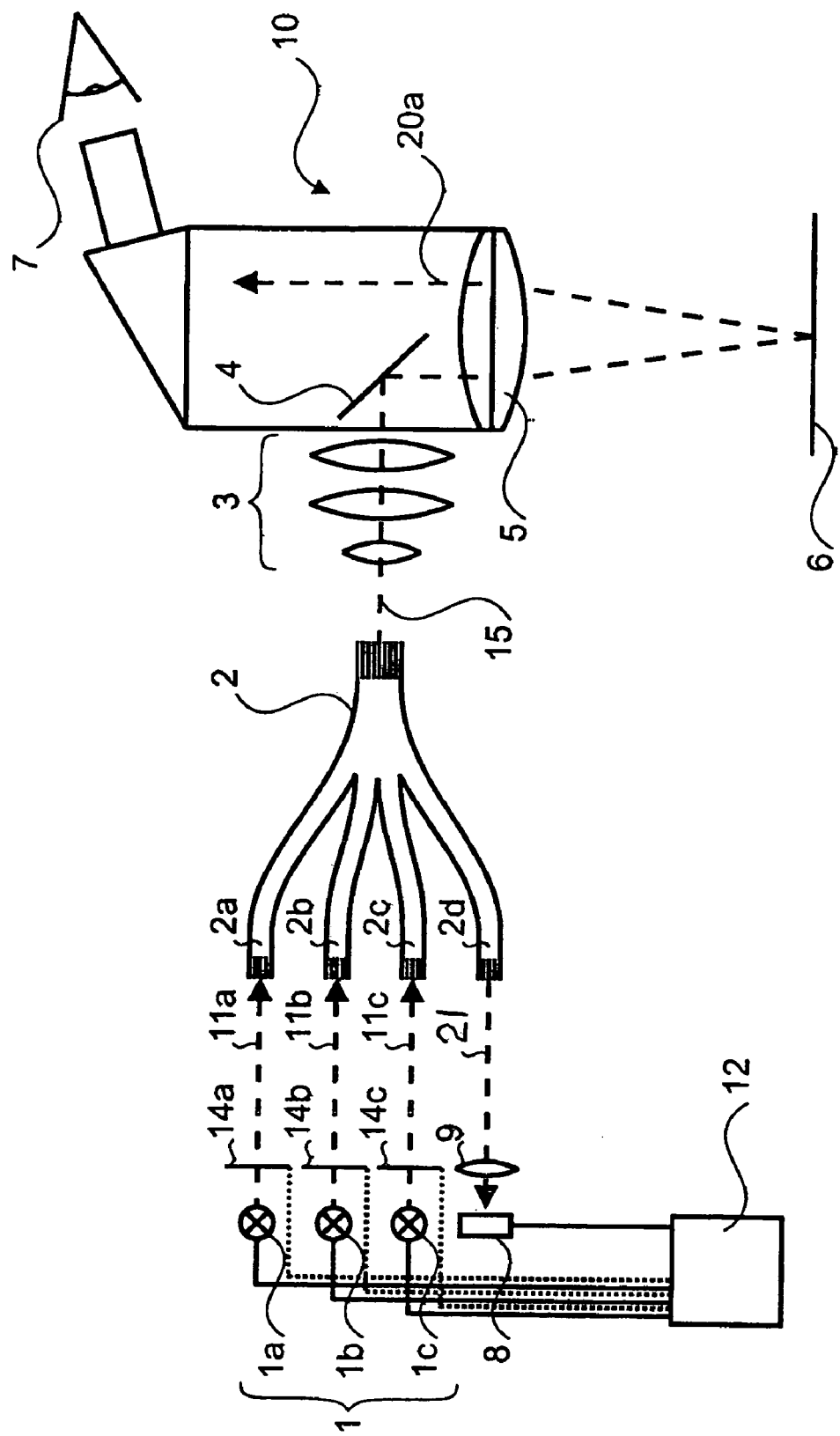
FIG. 4 shows the arrangement of FIG. 2 having an additional light guide arm, a measurement sensor, and a signal processing unit.

FIG. 4 shows that an additional light guide arm 2d conveys specimen light 21, reflected from specimen 6 and transported by it, via an optical system 9 to a measurement sensor 8. Measurement sensor 8 in turn forwards its measured data to a signal processing unit 12. The latter, in a freely preselectable or automatic regulation process, controls light-emitting diodes 1a, 1b, 1c and/or also corresponding filters 14a, 14b, 14c in terms of a desired spectrum.

Figure 5:
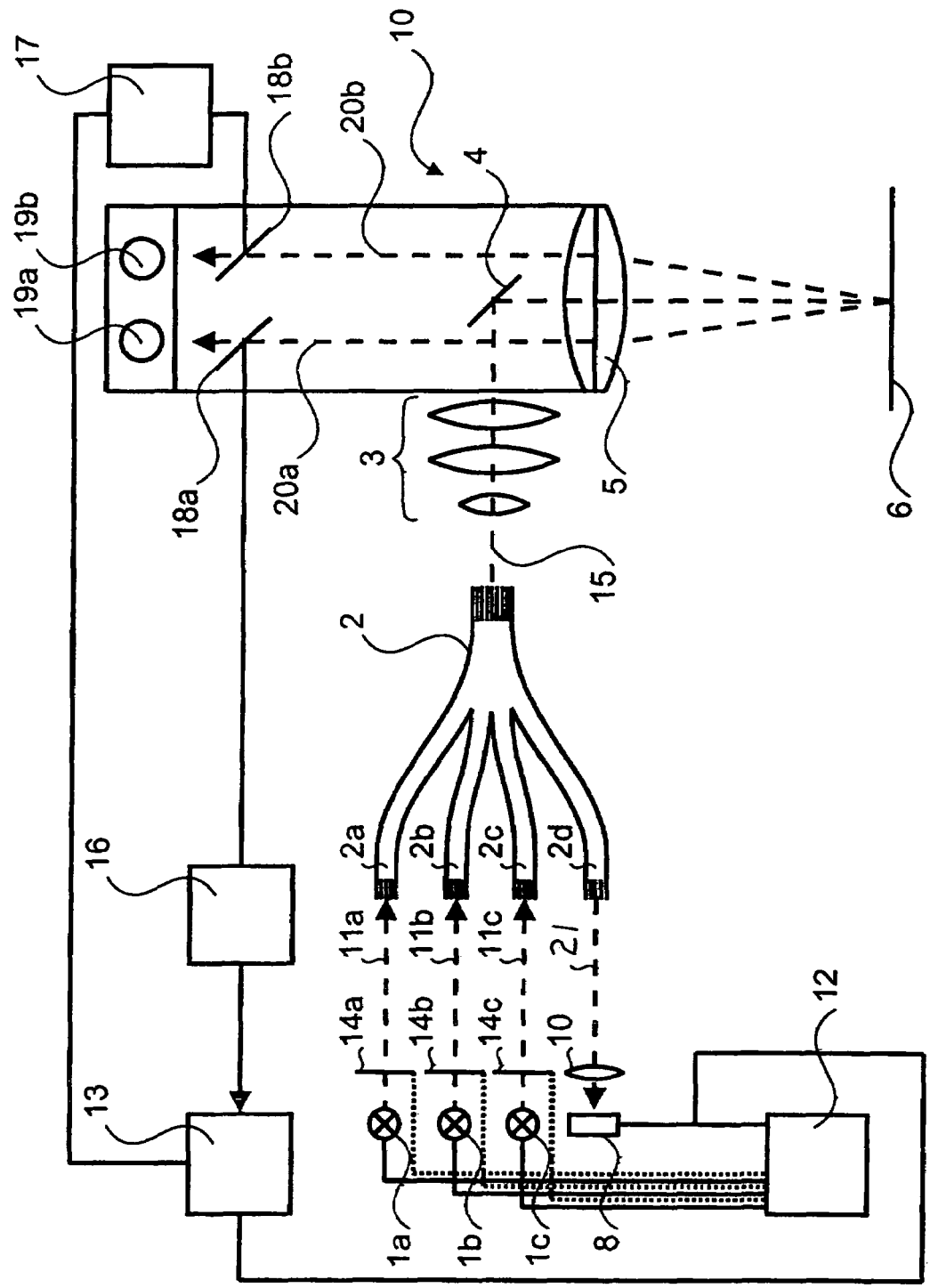
FIG. 5 shows the arrangement of a complex LED illumination apparatus according to the present invention having a computer as well as the capability for reflection into the observation beam paths of the optical observation device by means of a display.

FIG. 5 shows the arrangement of FIG. 4 supplemented by a computer 13 and a camera 16. Camera 16, using a deflection element 18a, takes from left observation beam path 20a of the stereoscopic optical observation device 10 an image that it conveys to computer 13. Computer 13 can retrieve stored data or images, optionally in false-color depiction, from its memory unit. These data and/or images from computer 13 are reflected via a display 17 and a deflection element 18b into right observation beam path 20b or right eyepiece 19b. In principle, stereoscopic reflection into both observation beam paths 20a, 20b is also possible.

Parts List 1, 1' LED arrangement
1a Red-light-emitting LED
1b Green-light-emitting LED
1c Blue-light-emitting LED
1d Yellow-light-emitting LED
1e Blue-light-emitting LED
2 Light guide with coupler
2a–d Light guide arms
3 Illuminating optical system
4 Mirror
5 Main objective
6 Specimen 7 Observer's eye
8 Measurement sensor
9 Optical system
10 Optical observation device
11a Red light
11b Green light
11c Blue light
11d Yellow light
12 Signal processing unit
13 Computer
14a–c Filter
15 White mixed light
16 Camera
17 Display
18a, b Deflection elements
19a Left eyepiece
19b Right eyepiece
20a, b Observation beam path
21 Specimen light

What is claimed is:

1. An illumination apparatus for a surgical microscope, the illumination apparatus comprising:
   an LED arrangement including a plurality of light-emitting diodes (LEDs) each emitting non-white light;
   a multi-arm light guide located after the LED arrangement, the multi-arm light guide including a coupler defining a single light exit end, wherein the multi-arm light guide includes one light guide arm associated with each of the plurality of LEDs, each of the light guide arms having a light-accepting end arranged to receive light from the associated LED, whereby light leaving the light guide through the light exit end is mixed to provide white illuminating light for the surgical microscope;
   a plurality of filters arranged one between each of the light guide arms and the LED associated therewith;
   a light-sensitive measurement sensor;
   at least one additional light guide arm arranged to direct light from the coupler to the measurement sensor, wherein the light from the coupler includes light reflected from an observed specimen; and
   a signal processing unit connected to the measurement sensor and to the plurality of LEDs and the plurality of filters, wherein the intensity and spectral composition of the light of the individual light-emitting diodes and the filters, are controlled by the signal processing unit.

2. The illumination apparatus according to claim 1, wherein the plurality of LEDs includes at least one red-light-emitting LED, at least one green-light-emitting LED, and at least one blue-light-emitting LED.

3. The illumination apparatus according to claim 1, wherein the plurality of LEDs includes at least one yellow-light-emitting LED and at least one blue-light-emitting LED.

4. The illumination apparatus as defined in claim 1, wherein each of the light guide arms includes a plurality of optical fibers, and the optical fibers of the light guide arms are mixed together with one another in the coupler.

5. The illumination apparatus as defined in claim 1, wherein the light guide is flexible.

6. The illumination apparatus as defined in claim 1, wherein the light accepting ends of the light guide arms are hot-melted.

7. The illumination apparatus as defined in claim 1, wherein the light exit end of the light guide is hot-melted.

8. The illumination apparatus as defined in claim 1, wherein the light guide comprises a light-guiding rod system.

9. The illumination apparatus as defined in claim 1, wherein the light guide is designed as a cross-section changer to allow for numerical aperture adaptation.

10. The illumination apparatus as defined in claim 1, wherein the plurality of light-emitting diodes includes at least one laser diode.

11. An apparatus comprising:
    a microscope;
    an LED arrangement including a plurality of light-emitting diodes (LEDs) each emitting non-white light, the LED arrangement being located outside of the microscope;
    a multi-arm light guide located after the LED arrangement, the multi-arm light guide including a coupler defining a single light exit end, wherein the multi-arm light guide includes one light guide arm associated with each of the plurality of LEDs, each of the light guide arms having a light-accepting end arranged to receive light from the associated LED, whereby light leaving the light guide through the light exit end is mixed to provide white illuminating light for the microscope;
    a plurality of filters arranged one between each of the light guide arms and the LED associated therewith;
    a light-sensitive measurement sensor;
    at least one additional light guide arm arranged to direct light from the coupler to the measurement sensor, wherein the light from the coupler includes light reflected from an observed specimen; and
    a signal processing unit connected to the measurement sensor and to the plurality of LEDs and the plurality of filters, wherein the intensity and spectral composition of the light of the individual light-emitting diodes and the filters are controlled by the signal processing unit to achieve a desired spectrum.

12. The apparatus as defined in claim 11, further comprising a camera associated with the microscope.

13. The apparatus as defined in claim 12, further comprising a computer connected to the camera.

14. The apparatus as defined in claim 13, further comprising a display associated with the microscope, wherein the display is connected to the camera and/or to the computer.

15. The apparatus as defined in claim 14, wherein the computer includes a memory unit for storing image data constituting false-color images, wherein the false-color images are retrievable by the display and can be reflected into at least one observation beam path of the microscope.

* * * * *